(12) United States Patent
Song et al.

(10) Patent No.: US 10,099,645 B2
(45) Date of Patent: Oct. 16, 2018

(54) CENTER AIRBAG DEVICE AND CONTROL METHOD THEREOF

(71) Applicant: HYUNDAI MOBIS CO., LTD., Seoul (KR)

(72) Inventors: Jiwoon Song, Yongin-si (KR); Ga Ram Jeong, Yongin-si (KR); Hae Kwon Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/599,253

(22) Filed: May 18, 2017

(65) Prior Publication Data

US 2017/0334390 A1    Nov. 23, 2017

(30) Foreign Application Priority Data

May 20, 2016 (KR) .......................... 10-2016-0062400

(51) Int. Cl.
*B60R 21/231* (2011.01)
*B60R 21/2338* (2011.01)
*B60R 21/207* (2006.01)
*B60R 21/264* (2006.01)

(52) U.S. Cl.
CPC ...... *B60R 21/23138* (2013.01); *B60R 21/207* (2013.01); *B60R 21/2338* (2013.01); *B60R 21/264* (2013.01); *B60R 2021/23146* (2013.01); *B60R 2021/23161* (2013.01); *B60R 2021/23382* (2013.01); *B60R 2021/23384* (2013.01)

(58) Field of Classification Search
CPC ........... B60R 2021/23384; B60R 2021/23161; B60R 2021/23382; B60R 21/23138; B60R 21/2338
See application file for complete search history.

(56) References Cited

U.S. PATENT DOCUMENTS

| | | | | |
|---|---|---|---|---|
| 7,275,763 B2* | 10/2007 | Thomas | ................ | B60R 21/276 280/736 |
| 7,690,683 B2* | 4/2010 | Parks | .................... | B60R 21/239 280/739 |
| 8,517,419 B2* | 8/2013 | Debler | ................ | B60R 21/2338 102/356 |

(Continued)

FOREIGN PATENT DOCUMENTS

WO    WO-2016050733 A1 *    4/2016    ........... B60R 21/239

OTHER PUBLICATIONS

Hellot et al., Airbag Comprising an Adaptive Ventilation Device, Apr. 7, 2016, EPO, WO 2016/050733 A1, Machine Translation of Description (Year: 2016).*

*Primary Examiner* — James A English
(74) *Attorney, Agent, or Firm* — Knobbe Martens Olson & Bear LLP

(57) ABSTRACT

A center airbag device may include: an inflator positioned between first and second seats, and generating an operating gas; a chamber part receiving the operating gas generated by the inflator, and expanding between the first and second seats; an internal tether part positioned in the chamber part, and connected to one or more of the top and side surfaces of the chamber part so as to control the deployment shape of the chamber part; and a locking release part connected to the internal tether part, and removing a restriction of the internal tether part according to a control signal.

5 Claims, 24 Drawing Sheets

(56) References Cited

U.S. PATENT DOCUMENTS

| | | | | |
|---|---|---|---|---|
| 8,777,260 B2* | 7/2014 | Kraznzle | ............... | B60R 21/217 |
| | | | | 280/739 |
| 9,205,798 B1* | 12/2015 | Jindal | ..................... | B60R 21/16 |
| 9,650,011 B1* | 5/2017 | Belwafa | ................. | B60R 21/233 |
| 9,682,681 B1* | 6/2017 | Patel | ..................... | B60R 21/239 |
| 2002/0101067 A1* | 8/2002 | Breed | .................. | B60N 2/0232 |
| | | | | 280/741 |
| 2009/0302588 A1* | 12/2009 | Schramm | ............. | B60R 21/233 |
| | | | | 280/743.2 |
| 2011/0298201 A1* | 12/2011 | Kobayashi | ............ | B60R 21/207 |
| | | | | 280/736 |
| 2012/0242069 A1* | 9/2012 | Parks | .................. | B60R 21/2338 |
| | | | | 280/743.2 |
| 2016/0039385 A1* | 2/2016 | Watamori | ......... | B60R 21/23138 |
| | | | | 280/730.1 |

\* cited by examiner

CENTER AIRBAG DEVICE AND CONTROL METHOD THEREOF

CROSS-REFERENCES TO RELATED APPLICATIONS

The present application claims priority to Korean application number 10-2016-0062400, filed on May 20, 2016, which is incorporated by reference in its entirety.

BACKGROUND OF THE INVENTION

The present invention relates to a center airbag device and a control method thereof, and more particularly, to a center airbag device capable of reducing an injury of an occupant by deploying an airbag in a different manner depending on the direction in which a collision impact is applied and whether a fellow occupant is seated, and a control method thereof.

In general, an airbag for a car refers to a safety device that reduces an impact applied to an occupant by deploying an airbag cushion when a collision accident occurs. The airbag for a car may be divided into DAB (Driver Air-Bag), PAB (Passenger Air-Bag), SAB (Side Air-Bag), CAB (Curtain Air-Bag) and the like.

When occupants are seated in a driver seat and passenger seat, respectively, an airbag may be deployed between the driver seat and the passenger seat, and thus prevent a collision between the occupants seated in the driver seat and the passenger seat.

In the related art, an airbag between occupants is deployed in the same shape in both a single mode and a dual mode. The single mode refers to a mode in which an occupant is seated only in a driver seat, and the dual mode refers to a mode in which occupants are seated in the driver seat and passenger seat. Therefore, when a side collision of the car occurs, the occupant may be excessively moved in the single mode. In this case, the injury of the occupant may be increased. Therefore, there is a demand for a structure capable of solving such a problem.

The related art of the present invention is disclosed in Korean Patent Publication No. 2012-0045647 published on May 9, 2012 and entitled "Airbag device for passenger seat".

SUMMARY OF THE INVENTION

Embodiments of the present invention are directed to a center airbag device capable of reducing an injury of an occupant by deploying an airbag in a different manner depending on the direction in which a collision impact is applied and whether a fellow occupant is seated, and a control method thereof.

In one embodiment, a center airbag device may include: an inflator positioned between first and second seats, and generating an operating gas; a chamber part receiving the operating gas generated by the inflator, and expanding between the first and second seats; an internal tether part positioned in the chamber part, and connected to one or more of the top and side surfaces of the chamber part so as to control the deployment shape of the chamber part; and a locking release part connected to the internal tether part, and removing a restriction of the internal tether part according to a control signal.

The center airbag device may further include: a sensor unit configured to sense the direction in which an impact is applied and whether a fellow occupant is seated; and a control unit configured to receive the sensed values of the sensor unit and control the operations of the inflator and the locking release part.

The chamber part may include: a first chamber installed in a shape covering the inflator and the locking release part, and expanded in the top and bottom direction between the first and second seats by the operation of the inflator; a second chamber extended from the top of the first chamber, and having an upward deployment shape guided by the internal tether part connected to the inside thereof; and a third chamber extended in a lateral direction of the first chamber, and having a lateral deployment shape guided by the internal tether part connected to the inside thereof.

The internal tether part may include: a first tether connecting the inside of the second chamber and the locking release part; and a second tether installed in a direction crossing the first tether, and connecting the inside of the third chamber and the locking release part.

When the second chamber is deployed, a first groove part may be concavely formed at the top surface of the second chamber by the first tether, and when the third chamber is deployed, a second groove part may be concavely formed at a side surface of the third chamber by the second tether.

The first tether may have an insertion protrusion connected thereto, and the insertion protrusion may be inserted and coupled into a connector part of the locking release part.

The locking release part may include: a locking body fixed to the inside of the chamber part; a connector part installed on the locking body and having an internal space into which the other side of the internal tether part is inserted; and a gas generator positioned in the connector part, and separating the internal tether part from the connector part by generating an expansion gas according to a control signal of the control unit.

In another embodiment, a control method of a center airbag device may include: determining whether an occupant is seated in a second seat set to a passenger seat; determining to which one of a near side collision and far side collision a collision event corresponds, when the occupant is seated in the second seat; and increasing the upper volume of a chamber part positioned between a first seat and the second seat when the collision event is the near side collision, and increasing the upper volume and side volume of the chamber part when the collision event is the far side collision.

The determining of whether the occupant is seated in the second seat may include sensing whether the occupant is seated, using a seat sensor installed under the seat of a car.

The chamber part may include: a first chamber expanded in the top and bottom direction between the first and second seats by an operation of an inflator; a second chamber extended from the top of the first chamber, and having an upward deployment shape guided by an internal tether part connected to the inside thereof; and a third chamber extended in a lateral direction of the first chamber, and having a lateral deployment shape guided by the internal tether part connected to the inside thereof.

When the second chamber is deployed, a first groove part may be concavely formed at the top surface of the second chamber by the first tether, and when the third chamber is deployed, a second groove part may be concavely formed at a side surface of the third chamber by the second tether.

In another embodiment, a control method of a center airbag device may include: determining whether an occupant is seated in a second seat set to a passenger seat; determining to which one of a near side collision and far side collision a collision event corresponds, when no occupant is seated in the second seat; and disabling a chamber part positioned between a first seat and the second seat when the collision event is the near side collision, and raising the inner pressure of the chamber part without increasing the upper volume and side volume of the chamber part when the collision event is the far side collision.

The determining of whether the occupant is seated in the second seat may include sensing whether the occupant is seated, using a seat sensor installed under the seat of a car.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
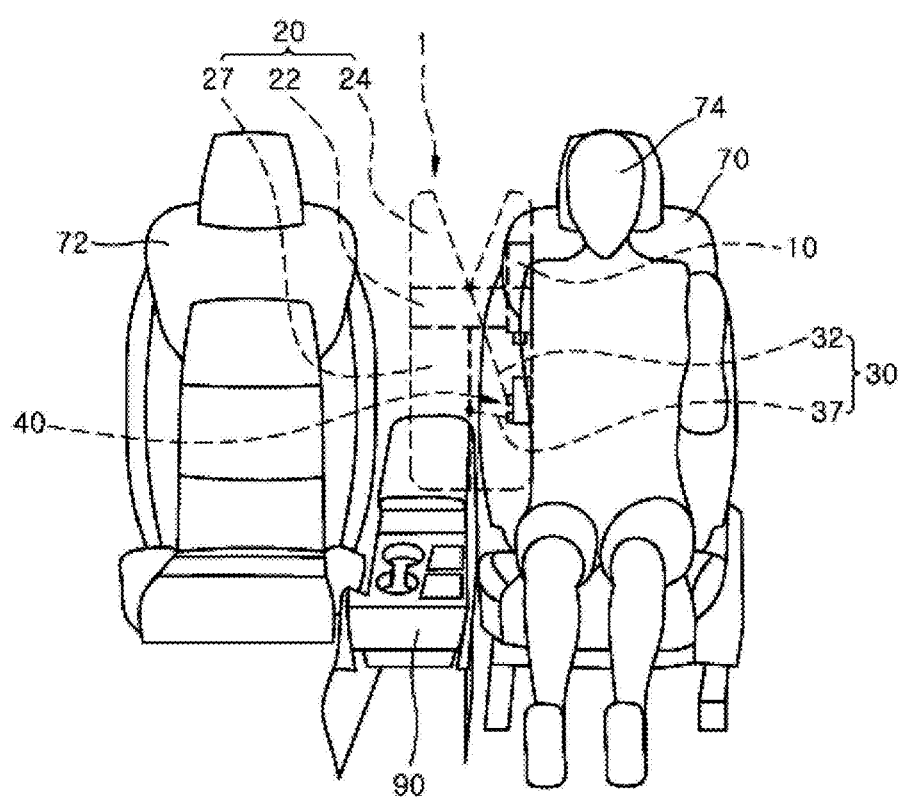
FIG. 1 is a front view schematically illustrating a state in which a center airbag device in accordance with an embodiment of the present invention is deployed in a first mode.
Figure 2:
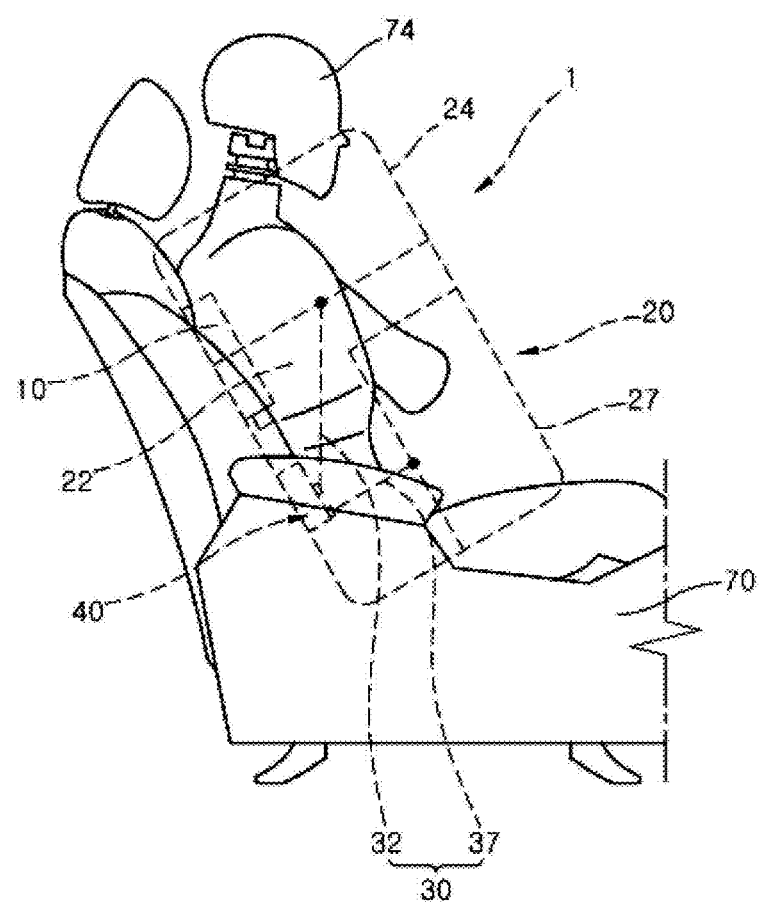
FIG. 2 is a side view schematically illustrating a state in which the center airbag device in accordance with the embodiment of the present invention is deployed in the first mode.
Figure 3:
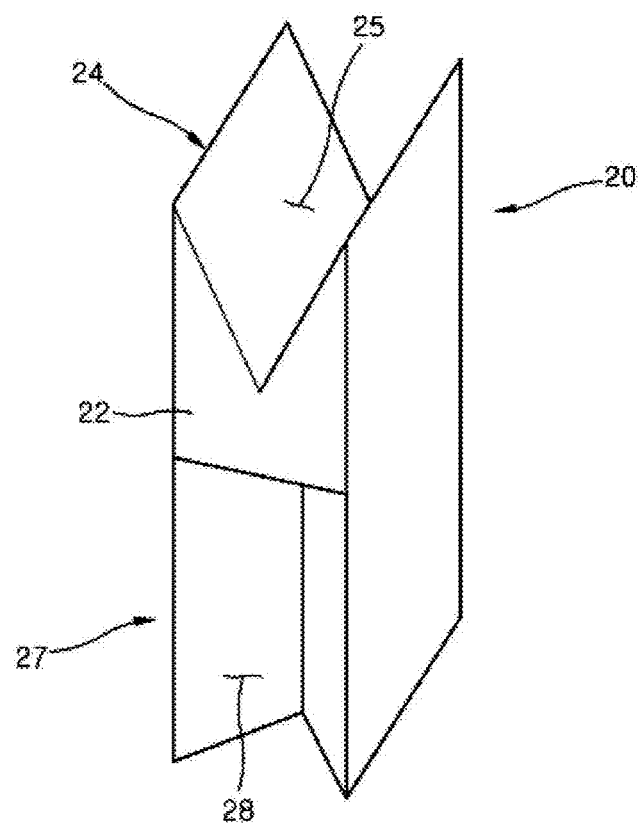
FIG. 3 is a perspective view illustrating a state in which a chamber part in accordance with the embodiment of the present invention is deployed in the first mode.
Figure 4:
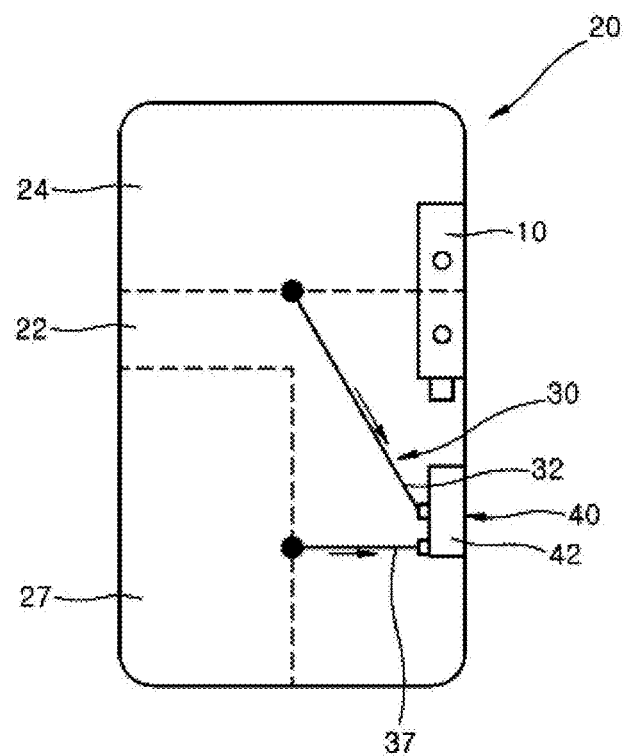
FIG. 4 is a side view illustrating a state in which the chamber part in accordance with the embodiment of the present invention is deployed in the first mode.
Figure 5:
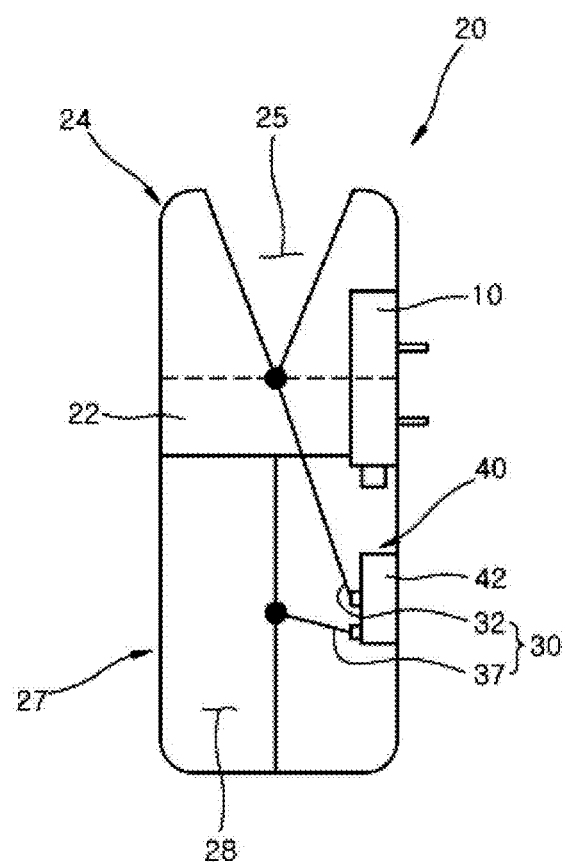
FIG. 5 is a front view illustrating a state in which the chamber part in accordance with the embodiment of the present invention is deployed in the first mode.
Figure 6:
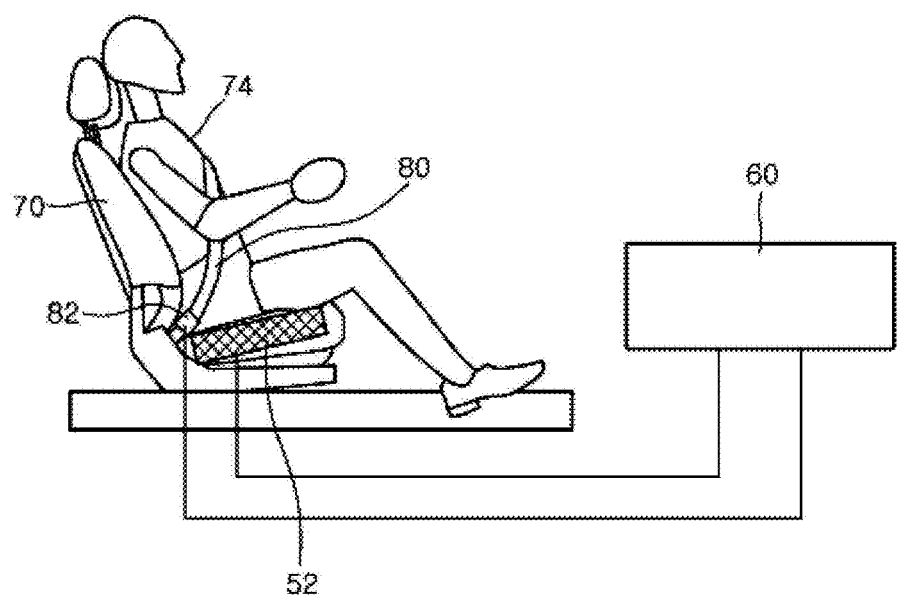
FIG. 6 is a diagram schematically illustrating a state in which a seat sensor in accordance with the embodiment of the present invention is installed.
Figure 7:
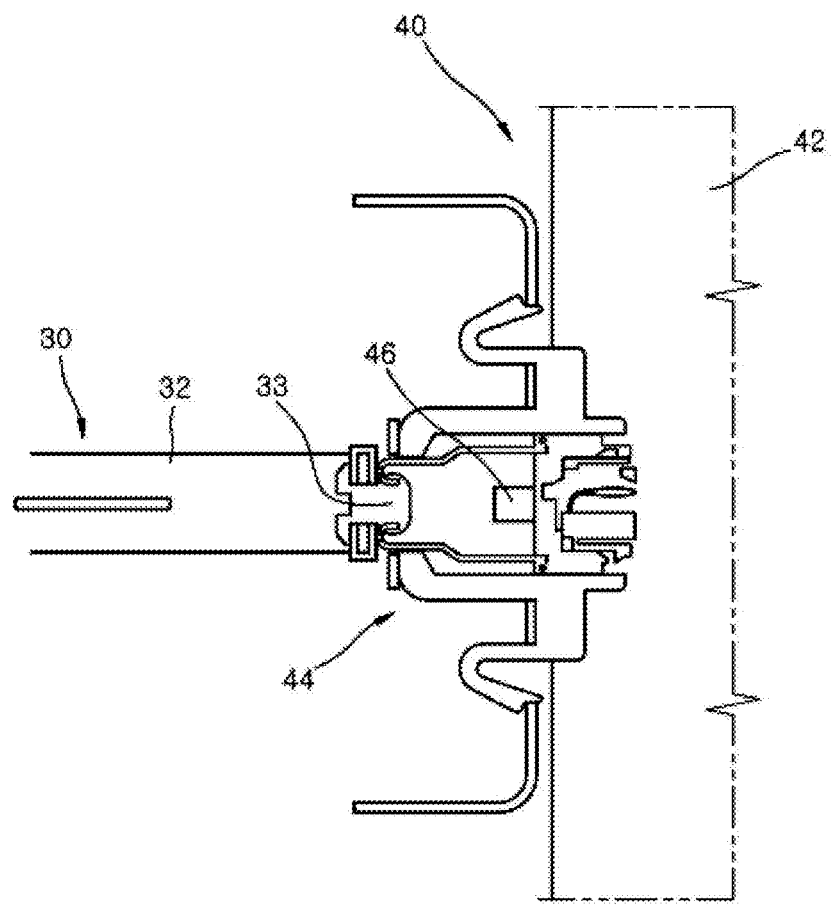
FIG. 7 is a cross-sectional view illustrating a state in which an insertion protrusion of an internal tether part in accordance with the embodiment of the present invention is inserted into a connector part of a locking release part.
Figure 8:
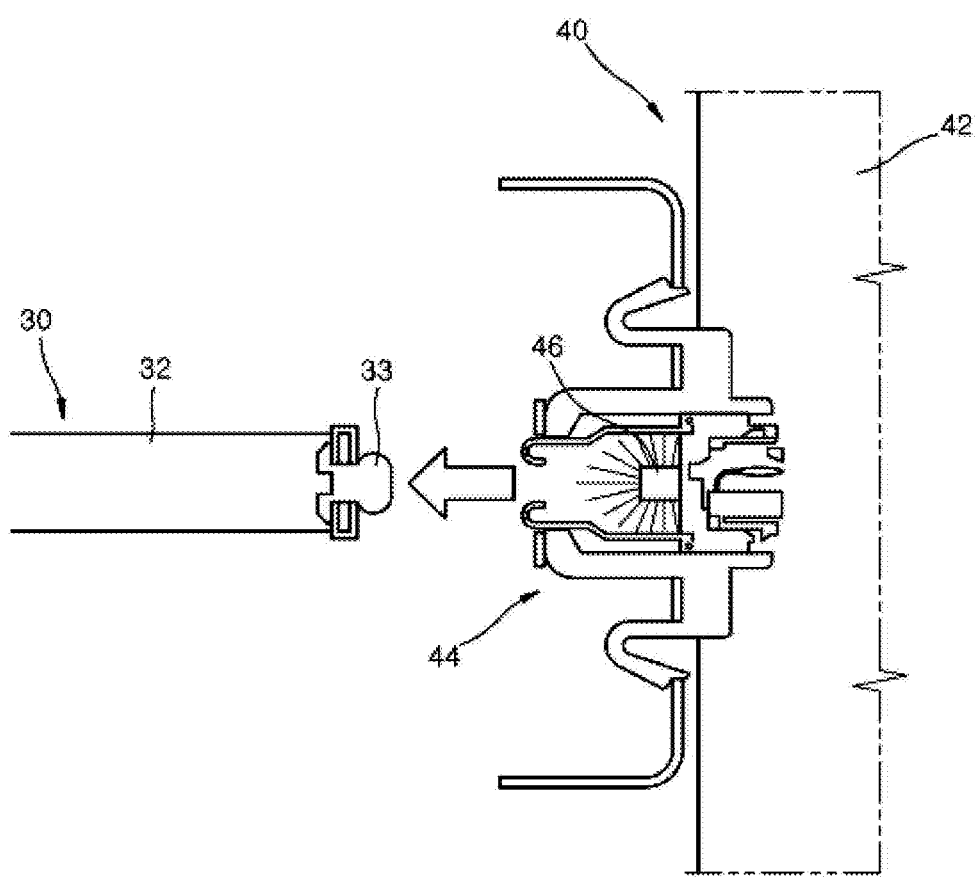
FIG. 8 is a cross-sectional view illustrating a state in which a gas generator in accordance with the embodiment of the present invention is operated to separate the insertion protrusion of the internal tether part from the connector part.
Figure 13:
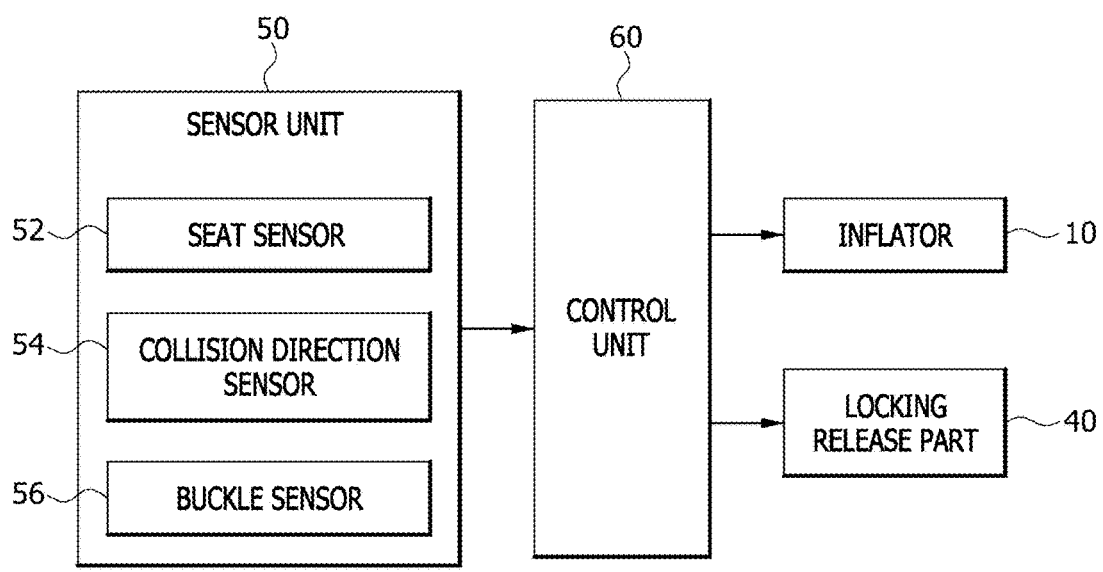
FIG. 13 is a block diagram of the center airbag device in accordance with the embodiment of the present invention.

FIG. 1 is a front view schematically illustrating a state in which a center airbag device in accordance with an embodiment of the present invention is deployed in a first mode, FIG. 2 is a side view schematically illustrating a state in which the center airbag device in accordance with the embodiment of the present invention is deployed in the first mode, FIG. 3 is a perspective view illustrating a state in which a chamber part in accordance with the embodiment of the present invention is deployed in the first mode, FIG. 4 is a side view illustrating a state in which the chamber part in accordance with the embodiment of the present invention is deployed in the first mode, FIG. 5 is a front view illustrating a state in which the chamber part in accordance with the embodiment of the present invention is deployed in the first mode, FIG. 6 is a diagram schematically illustrating a state in which a seat sensor in accordance with the embodiment of the present invention is installed, FIG. 7 is a cross-sectional view illustrating a state in which an insertion protrusion of an internal tether part in accordance with the embodiment of the present invention is inserted into a connector part of a locking release part, FIG. 8 is a cross-sectional view illustrating a state in which a gas generator in accordance with the embodiment of the present invention is operated to separate the insertion protrusion of the internal tether part from the connector part, and FIG. 13 is a block diagram of the center airbag device in accordance with the embodiment of the present invention.

As illustrated in FIGS. 1, 4 and 13, the center airbag device in accordance with the embodiment of the present invention may include an inflator 10, a chamber part 20, an internal tether part 30 and a locking release part 40. The inflator 10 may be positioned between first and second seats 70 and 72 and generate an operating gas, the chamber part 20 may receive the operating gas generated by the inflator 10 and expand between the first and second seats 70 and 72, the internal tether part 30 may be positioned in the chamber part 20 and connected to one or more of the top and side surfaces of the chamber part 20 to control the deployment shape of the chamber part 20, and the locking release part 40 may be connected to the internal tether part 30 and remove the connection to the internal tether part 30 according to a control signal.

The inflator 10 may be modified in various manners as long as the inflator 10 can generate an operating gas to expand the chamber part 20 while being positioned between the first and second seats 70 and 72. The inflator 10 may be fixed to the first or second seat 70 or 72, and fixed to a car body 110 including a console box 90. The inflator 10 may generate an operating gas according to a control signal of the control unit 60.

The chamber part 20 may be deployed in various shapes as long as the chamber part 20 can receive the operating gas generated by the inflator 10 and expand between the first and second seats 70 and 72. The chamber part 20 in accordance with the embodiment of the present invention may include a first chamber 22, a second chamber 24 and a third chamber 27.

As illustrated in FIGS. 3 to 5, the first chamber 22 may be installed in a shape covering the outsides of the inflator 10 and the locking release part 40, and expanded in the top and bottom direction between the first and second seats 70 and 72 by the operation of the inflator 10. In the first chamber 22, the inflator 10 and the locking release part 40 may be positioned. When the inflator 10 is operated, the first chamber 22 may be deployed upward and downward from the inflator 10, and restrict a lateral motion of an occupant 74.

The second chamber 24 may be extended upward from the top of the first chamber 22, and have an upper deployment shape guided by the internal tether part 30 connected to the inside thereof. The third chamber 27 may be extended laterally from the first chamber 22, and have a lateral deployment shape guided by the internal tether part 30 connected to the inside thereof.

The inside of the second chamber 24 may be connected to a first tether 32, and the inside of the third chamber 27 may be connected to a second tether 37. One side of the first tether 32 may be connected to the inside of the second chamber 24, and the other side of the first tether 32 may be connected to a connector part 44 of the locking release part 40. One side of the second tether 37 may be connected to the inside of the third chamber 27, and the other side of the second tether 37 may be connected to the connector part 44 of the locking release part 40.

The deployment shape of the second chamber 24 may be controlled depending on whether the first tether 32 is connected to the locking release part 40, and the deployment shape of the third chamber 27 may be controlled depending on whether the second tether 37 is connected to the locking release part 40.

The internal tether part 30 in accordance with the embodiment of the present invention may be formed in various shapes as long as the internal tether part 30 can be positioned in the chamber part 20 and connected to one or more of the top and side surfaces of the chamber part 20 to control the deployment of the chamber part 20. The internal tether part 30 may include the first and second tethers 32 and 37.

The first tether 32 may be formed in a string or band shape. One side of the first tether 32 may be fixed to the inside of the second chamber 24, and the other side of the first tether 32 may be connected to the locking release part 40. The first tether 32 may connect the inside of the second chamber 24 and the locking release part 40, and pull down the second chamber 24 to form a first groove part 25.

As illustrated in FIGS. 7 and 8, the first tether 32 may have an insertion protrusion 33 connected to the other side thereof, and the insertion protrusion 33 may be connected to the connector part 44 of the locking release part 40. The insertion protrusion 33 may be formed in a shape protruding toward the locking release part 40 from the first tether 32, and inserted into the connector part 44 of the locking release part 40.

As illustrated in FIGS. 3 to 5, the second tether 37 may be installed in a direction crossing the first tether 32, connect the inside of the third chamber 27 and the locking release part 40, and pull the third chamber 27 inwardly to form a second groove part 28.

The length of the first tether 32 may be shorter than the distance between the top of the second chamber 24 and the locking release part 40. Therefore, when both ends of the first tether 32 are connected to the second chamber 24 and the locking release part 40, a concave groove may be formed at the top of the second chamber 24 connected to the first tether 32.

Furthermore, the length of the second tether 37 may be shorter than the distance between the locking release part 40 and the side surface of the third chamber 27 deployed in the lateral direction. Therefore, when both ends of the second tether 37 are connected to the third chamber 27 and the locking release part 40, a concave groove may be formed at the side surface of the third chamber 27 connected to the second tether 37.

As illustrated in FIGS. 1, 6 and 13, the control unit 60 may receive information on whether an occupant 74 and fellow occupant 76 are seated in the first and second seats 70 and 72 and a collision direction of the car, based on sensed values of the sensor unit 50, and decide the deployment mode of the chamber part 20. That is, the control unit 60 may adjust the cushion volume and inner pressure of the chamber part 20 and the region for covering an impact, depending on whether the first and second tethers 32 and 37 are released. The upper cushion and covering region of the chamber part 20 may be decided depending on whether the first tether 32 is released, and the front cushion and covering region of the chamber part 20 may be decided depending on whether the second tether 37 is released.

The locking release part 40 may be formed in various shapes as long as the locking release part 40 can be connected to the internal tether part 30 at the inner surface or side surface of the chamber part 20 and remove the connection to the internal tether part 30 according to a control signal. The locking release part 40 in accordance with the embodiment of the present invention may include a locking body 42, the connector part 44 and a gas generator 46.

The locking body 42 may be fixed to the inside of the chamber part 20. The connector part 44 may be installed at a side surface of the locking body 42, and have an inner space into which the insertion protrusion 33 formed at the other side of the internal tether part 30 is inserted. The number of connector parts 44 may be equal to the number of tethers included in the internal tether part 30. Since the internal tether part 30 in accordance with the embodiment of the present invention includes the first and second tethers 32 and 37, two connector parts 44 may be installed. The two connector parts 44 may be separately operated according to control of the control unit 60, and the connections between the first and second tethers 32 and 37 and the connector parts 44 may be maintained or released.

As illustrated in FIGS. 7, 8 and 13, the gas generator 46 may be positioned in the connector part 44, and generate an expansion gas according to a control signal of the control unit 60. Therefore, the gas generator 46 may perform an operation of separating the internal tether part 30 from the connector part 44. The gas generators 46 may be installed in the inner spaces of the respective connector parts 44, and separately operated according to the control signal of the control unit 60. Therefore, the internal tether part 30 connected to a location where the gas generator 46 is operated to ignite powder may be separated from the locking release part 40, and the internal tether part 30 connected to a location where the gas generator 46 is not operated may maintain the connection to the locking release part 40.

As illustrated in FIGS. 6 and 13, the control unit 60 may operate the inflator 10 and the locking release part 40 based on information on whether a seat belt 80 is connected to a seat belt buckle 82 and sensed values of a seat sensor 52 and collision direction sensor 54 in the sensor unit 50, when the information and the sensed values are transmitted to the control unit 60.

Depending on the information on whether the fellow occupant 76 is seated and the direction in which an impact is applied to the car, the locking release part 40 may be operated to deploy the cushion of the chamber part 20 according to each collision mode. The behavior of an occupant may differ depending on each collision mode, and the control unit 60 may decide the shape of the cushion for restricting such a behavior depending on whether the first and second tethers 32 and 37 are released, in order to cope with the collision mode.

The sensor unit 50 may include various types of sensors as long as the sensor unit 50 can sense whether occupants are seated in the first and second seats 70 and 72 and the collision direction of the car. The sensor unit 50 in accordance with the present embodiment may include the seat sensor 52, the collision direction sensor 54 and a buckle sensor 56.

The seat sensor 52 may be installed under the seats of the car including the first and second seats 70 and 72, and sense whether the occupant 74 or fellow occupant 76 is seated. The collision direction sensor 54 may sense a collision direction of the car while sensing a collision of the car, and transmit the sensed values to the control unit 60.

The buckle sensor 56 may determine whether the seat belt 80 installed at each seat is coupled to the seat belt buckle 82, and transmit the determination result to the control unit 60.

Since the control unit 60 receives the sensed values of the sensor unit 50 and controls the operation of the locking release part 40, the control unit 60 may control the deployment shape of the chamber part 20 in each mode.

When a far side collision occurs while the fellow occupant 76 is not seated in the second seat 72 set to the passenger seat, the inflator 10 may be operated to perform a first mode in which the first and second tethers 32 and 37 are connected to the locking release part 40.

When a near side collision occurs while the fellow occupant 76 is seated in the second seat 72 set to the passenger seat, the inflator 10 may be operated to perform a second mode in which the connection between the first tether 32 and the locking release part 40 is removed and the connection between the second tether 37 and the locking release part 40 is maintained.

When a far side collision occurs while the fellow occupant 76 is seated in the second seat 72 set to the passenger seat, the inflator 10 may be operated to perform a third mode in which the connections between the first and second tethers 32 and 37 and the locking release part 40 are removed.

Figure 9:
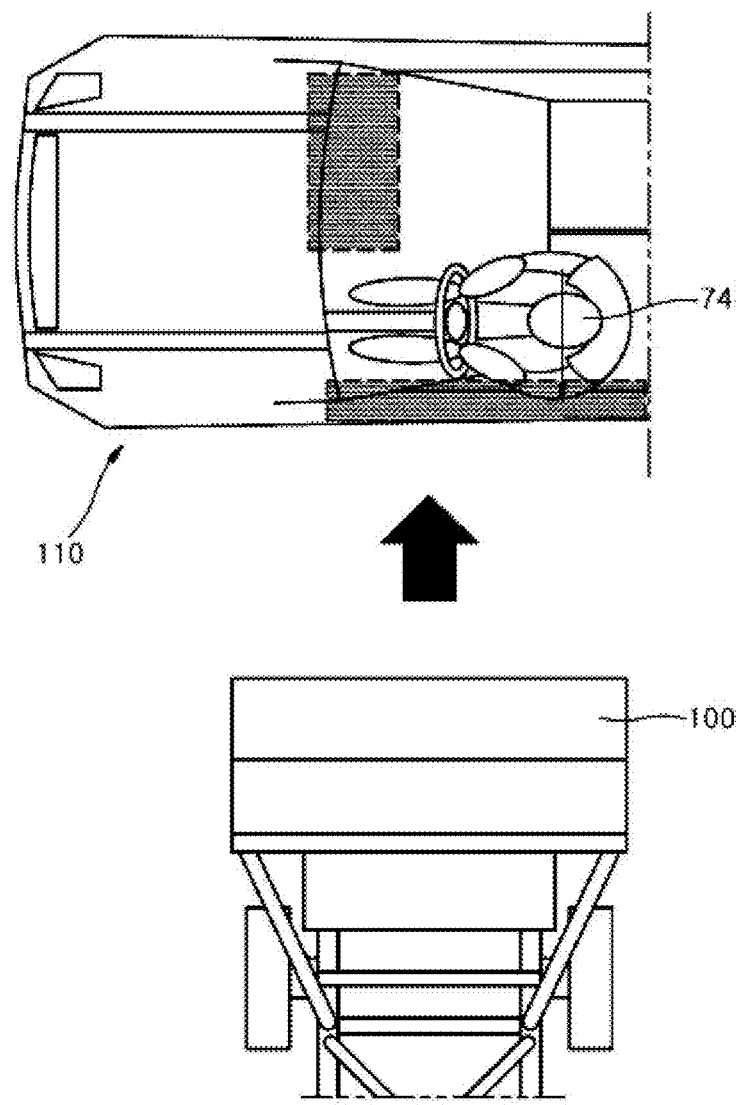
FIG. 9 is a diagram illustrating that a near side collision occurs in a single mode.
Figure 10:
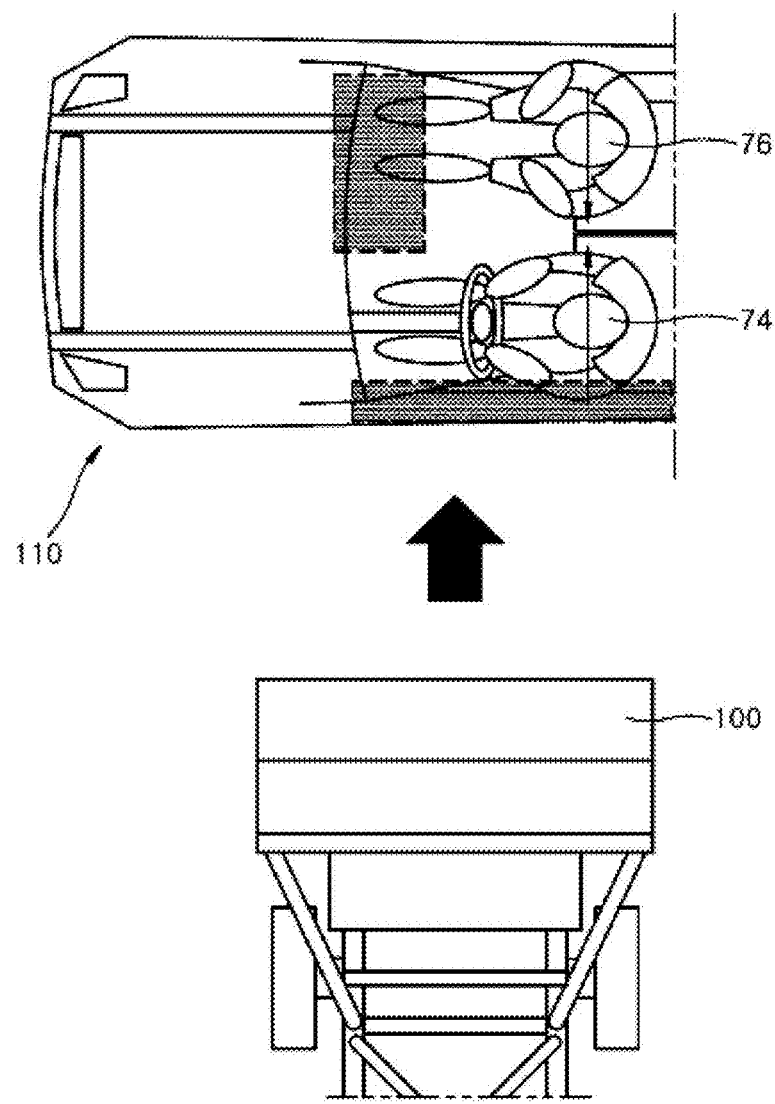
FIG. 10 is a diagram illustrating that a near side collision occurs in a dual mode.
Figure 11:
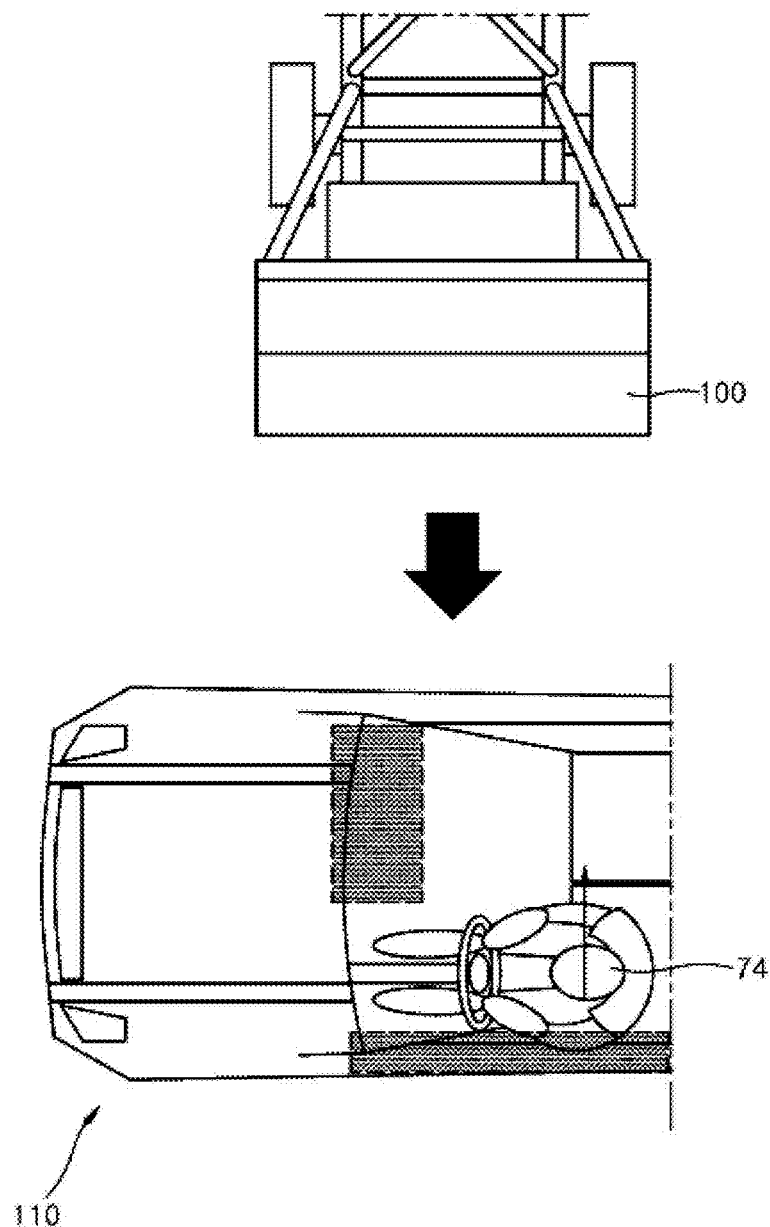
FIG. 11 is a diagram illustrating that a far side collision occurs in the single mode.
Figure 12:
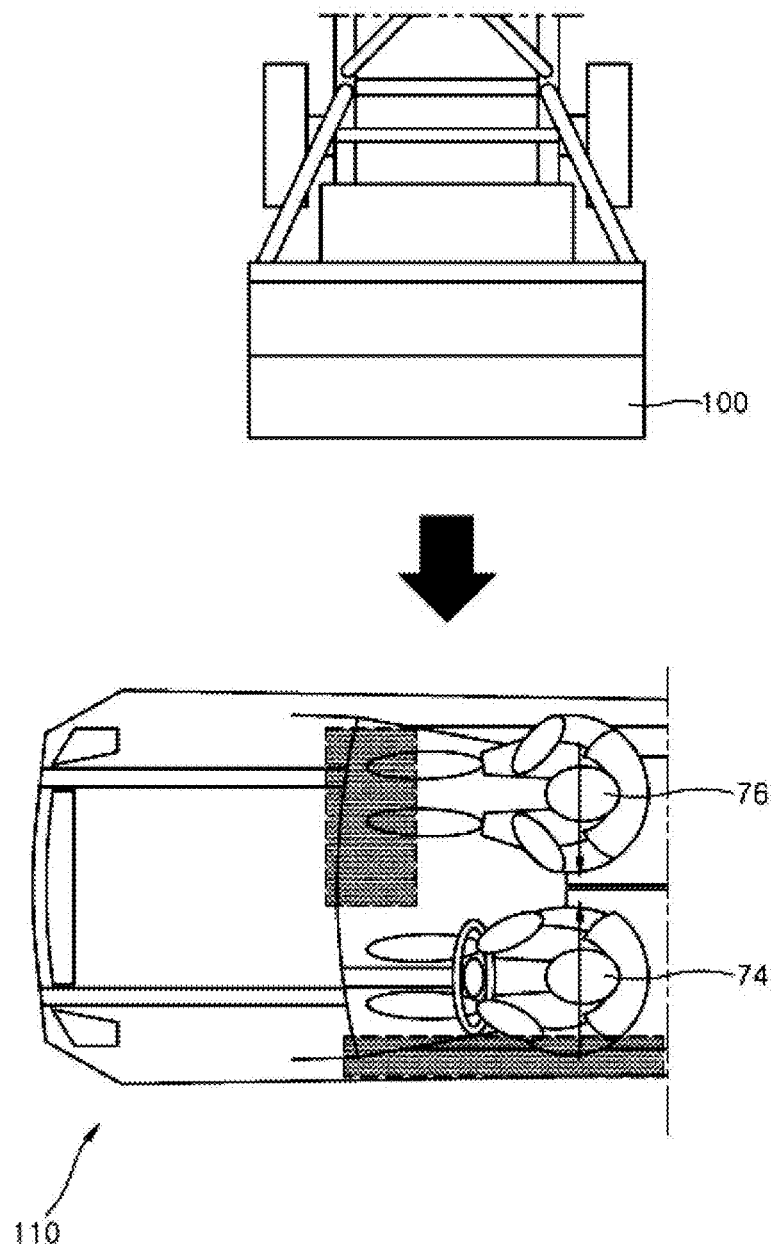
FIG. 12 is a diagram illustrating that a far side collision occurs in the dual mode.

FIG. 9 is a diagram illustrating that a near side collision occurs in the single mode, FIG. 10 is a diagram illustrating that a near side collision occurs in the dual mode, FIG. 11 is a diagram illustrating that a far side collision occurs in the single mode, and FIG. 12 is a diagram illustrating that a far side collision occurs in the dual mode.

As illustrated in FIG. 9, when a near side collision in which an impact application part 100 hits the car body 110 at the side of the driver seat occurs in the single mode where the occupant 74 serving as a driver is seated in the first seat 70, a curtain airbag and a side airbag may be operated to protect the occupant 74. Therefore, the chamber part 20 may not be expanded.

As illustrated in FIG. 10, when a near side collision in which the impact application part 100 hits the car body 110 at the side of the driver seat occurs in the dual mode where the occupant 74 is seated in the first seat 70 and the fellow occupant 76 is seated in the second seat 72, the center airbag device 1 may be operated in the second mode. In this case, since the probability that the occupants will be injured by a collision between the occupants is high, an airbag action between the occupants may be required.

As illustrated in FIG. 11, when a far side collision in which the impact application part 100 hits the car body 110 at the side of the passenger seat occurs in the single mode where the occupant 74 serving as a driver is seated in the first seat 70, the center airbag device 1 may be operated in the first mode. In this case, the chamber part 20 needs to be deployed while the width of the chamber part 20 is sufficiently secured, in order to block the occupant 74 in the first seat 70 from being moved to the second seat 72 by the impact.

As illustrated in FIG. 12, when a far side collision in which the impact application part 100 hits the car body 110 at the side of the passenger seat occurs in the dual mode where the occupant 74 is seated in the first seat 70 and the fellow occupant 76 is seated in the second seat 72, the center airbag device 1 may be operated in the third mode. In this case, since the probability that the occupants will be injured by a collision between the occupants is high, an airbag action between the occupants may be required.

In the center airbag device 1, the deployment shape of the chamber part 20 may differ depending on whether an occupant is seated in the second seat 72 set to the passenger seat. In the dual mode where an occupant is seated in the second seat 72 set to the passenger seat, the volume of the chamber part 20 may be increased, and the pressure of the chamber part 20 may be lowered to reduce an injury caused by a collision between the heads of the occupants. Furthermore, in the single mode where the occupant 76 is not seated in the second seat 72 set to the passenger seat, the cushion volume of the chamber part 20 may be decreased, and the pressure of the chamber part 20 may be raised to limit the behavior of the occupant, thereby protecting the occupant.

That is, when the center airbag device 1 is operated in the first mode, the sensor unit 50 may sense whether the occupant is seated in the second seat 72 set to the passenger seat, and decide whether to operate in the dual mode or the single mode. Depending on the collision mode, the operating condition of the internal tether part 30 may be decided.

When a far side collision occurs in the single mode, the chamber part 20 may be expanded, and the first and second tethers 32 and 37 may pull the second and third chambers 24 and 27 toward where the locking release part 40 is installed, as illustrated in FIGS. 1 to 5. Therefore, the volume of the chamber part 20 may be decreased, and the inner pressure of the chamber part 20 may be raised to limit the behavior of the single occupant, thereby protecting the single occupant.

When a near side collision occurs in the single mode, the center airbag device 1 may not be operated because the center airbag device 1 does not perform the protection function.

Figure 15:
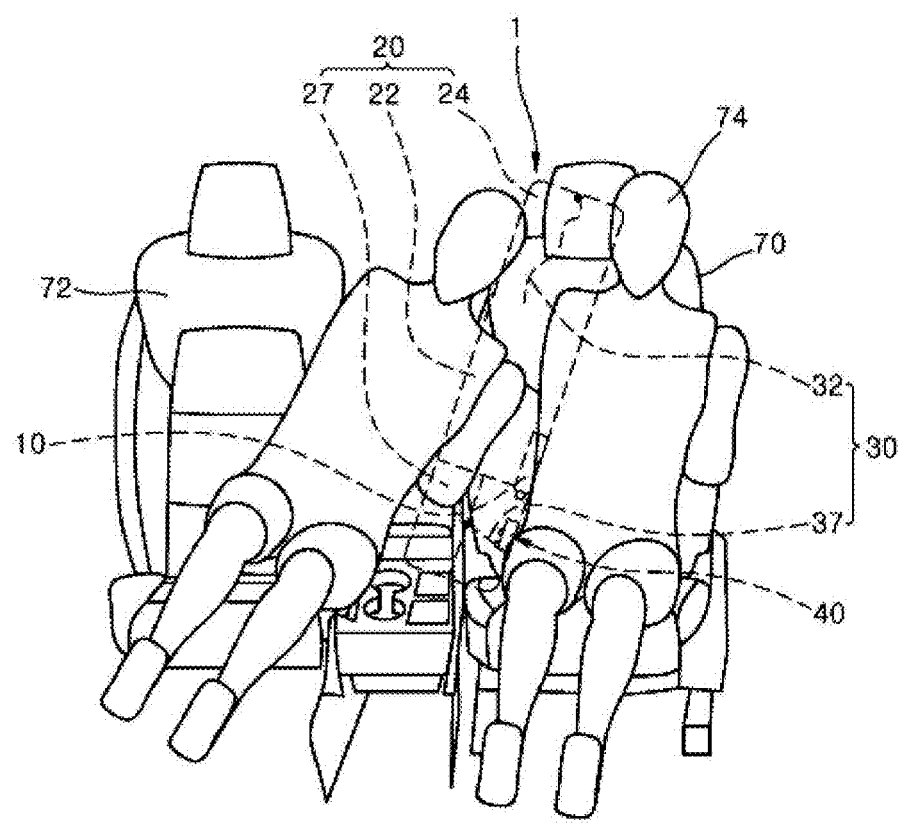
FIG. 15 is a front view schematically illustrating a state in which the center airbag device in accordance with the embodiment of the present invention is deployed in a second mode.
Figure 16:
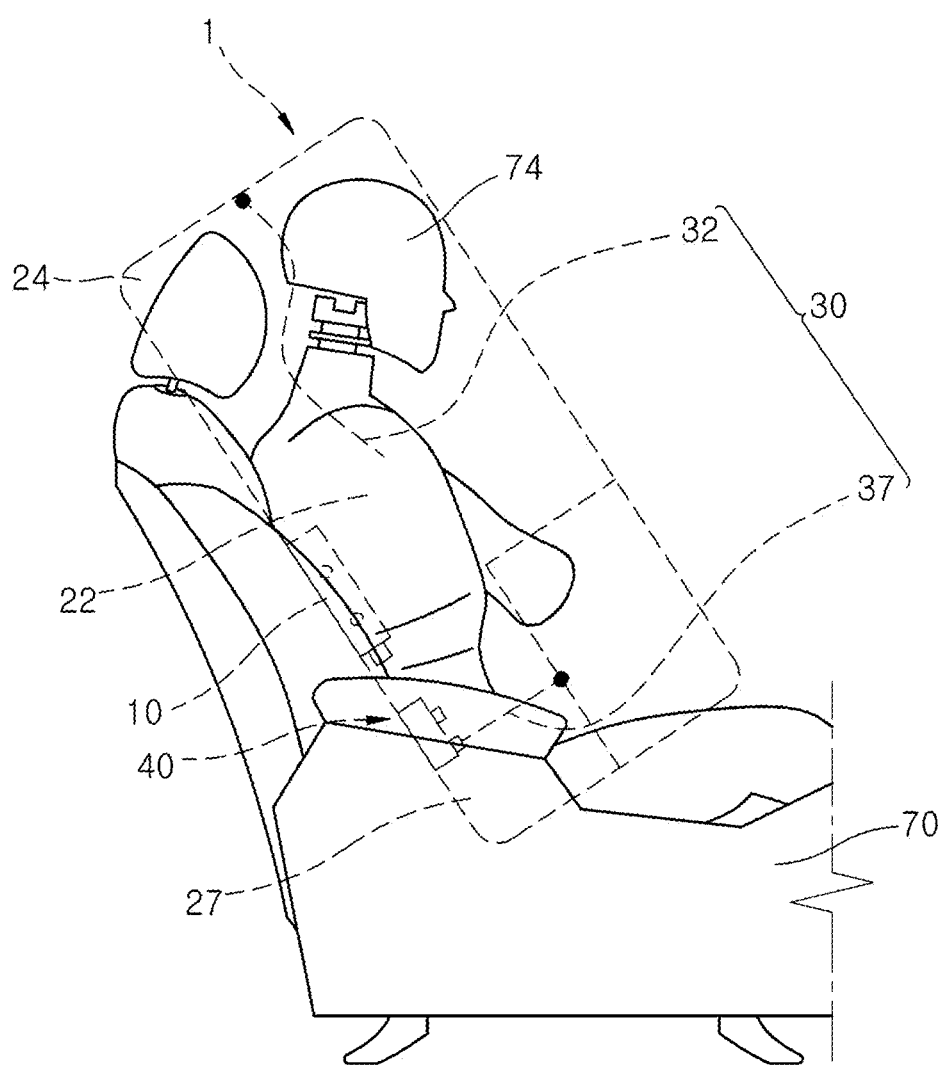
FIG. 16 is a side view schematically illustrating a state in which the center airbag device in accordance with the embodiment of the present invention is deployed in the second mode.
Figure 17:
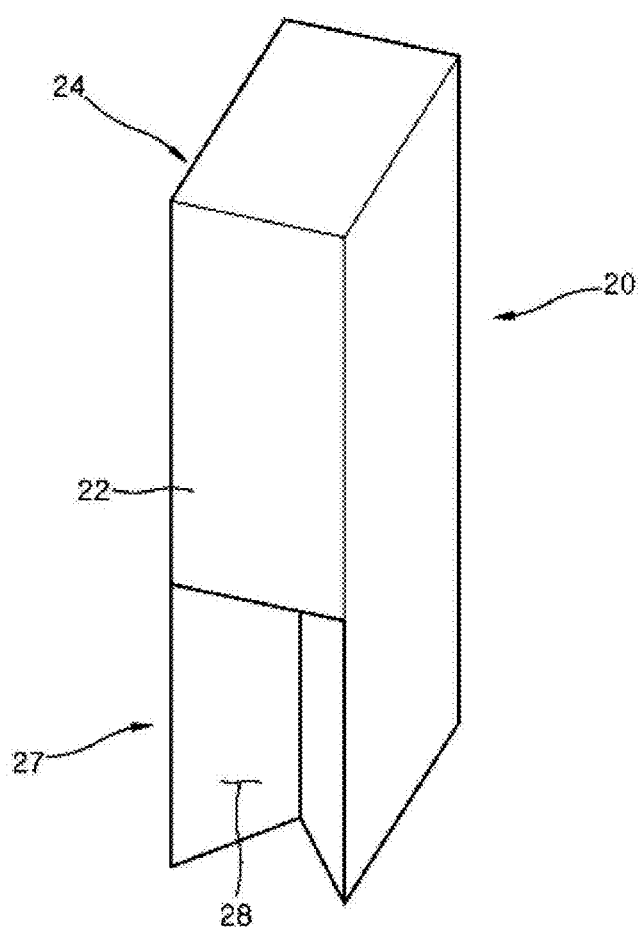
FIG. 17 is a perspective view illustrating a state in which the chamber part in accordance with the embodiment of the present invention is deployed in the second mode.
Figure 18:
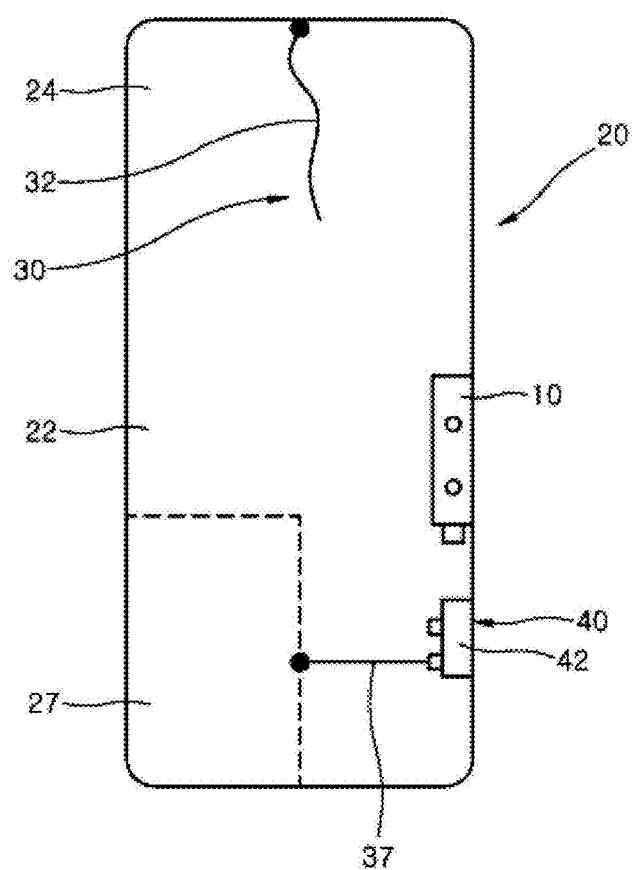
FIG. 18 is a side view illustrating a state in which the chamber part in accordance with the embodiment of the present invention is deployed in the second mode.
Figure 19:
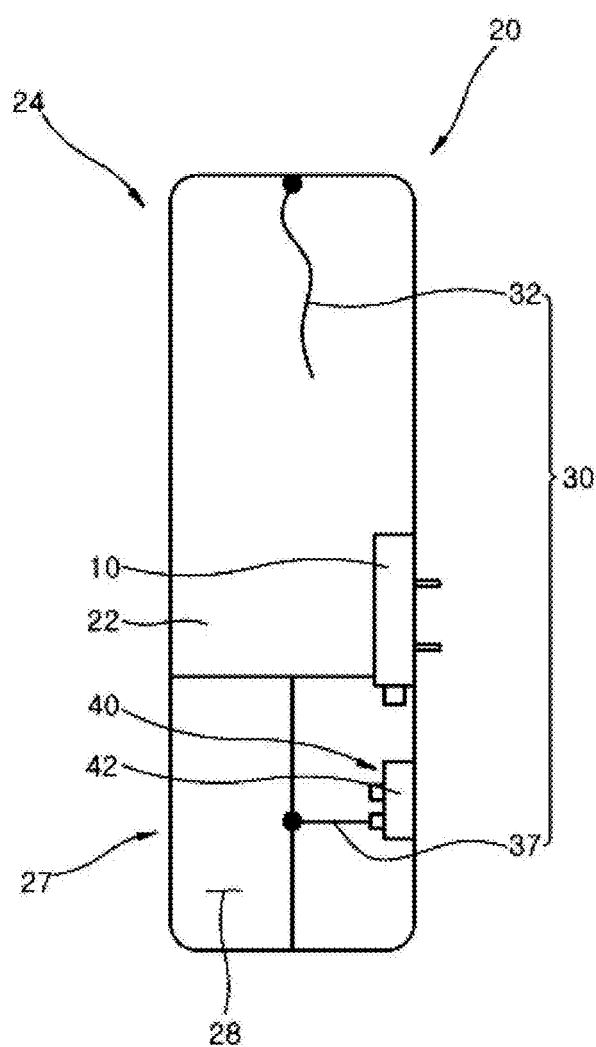
FIG. 19 is a front view illustrating a state in which the chamber part in accordance with the embodiment of the present invention is deployed in the second mode.

FIG. 15 is a front view schematically illustrating a state in which the center airbag device in accordance with the embodiment of the present invention is deployed in the second mode, FIG. 16 is a side view schematically illustrating a state in which the center airbag device in accordance with the embodiment of the present invention is deployed in the second mode, FIG. 17 is a perspective view illustrating a state in which the chamber part in accordance with the embodiment of the present invention is deployed in the second mode, FIG. 18 is a side view illustrating a state in which the chamber part in accordance with the embodiment of the present invention is deployed in the second mode, and FIG. 19 is a front view illustrating a state in which the chamber part in accordance with the embodiment of the present invention is deployed in the second mode.

As illustrated in FIGS. 15 to 19, when a near side collision occurs in the dual mode, the chamber part 20 may be expanded, and the first tether 32 may be separated from the locking release part 40. Therefore, the restriction of the upward movement of the second chamber 24 may be removed. Thus, the second chamber 24 may secure the coverage up to the head of the occupant, and the volume of the chamber part 20 may be increased to lower the inner pressure, thereby protecting the occupants from a collision between the heads of the occupants.

Figure 20:
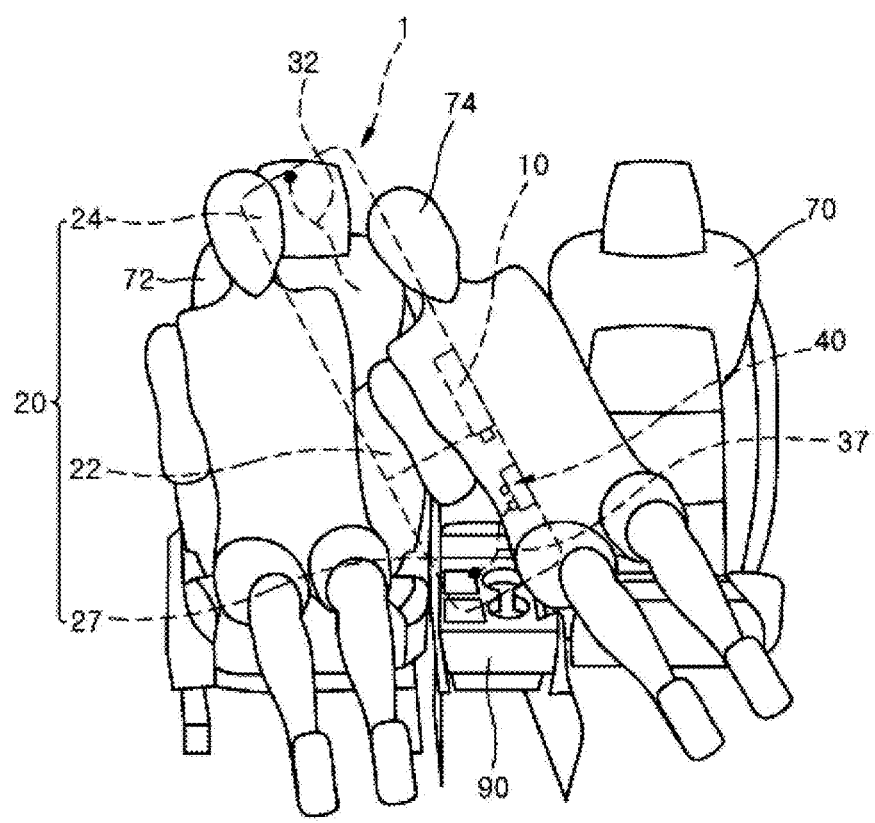
FIG. 20 is a front view schematically illustrating a state in which the center airbag device in accordance with the embodiment of the present invention is deployed in a third mode.
Figure 21:
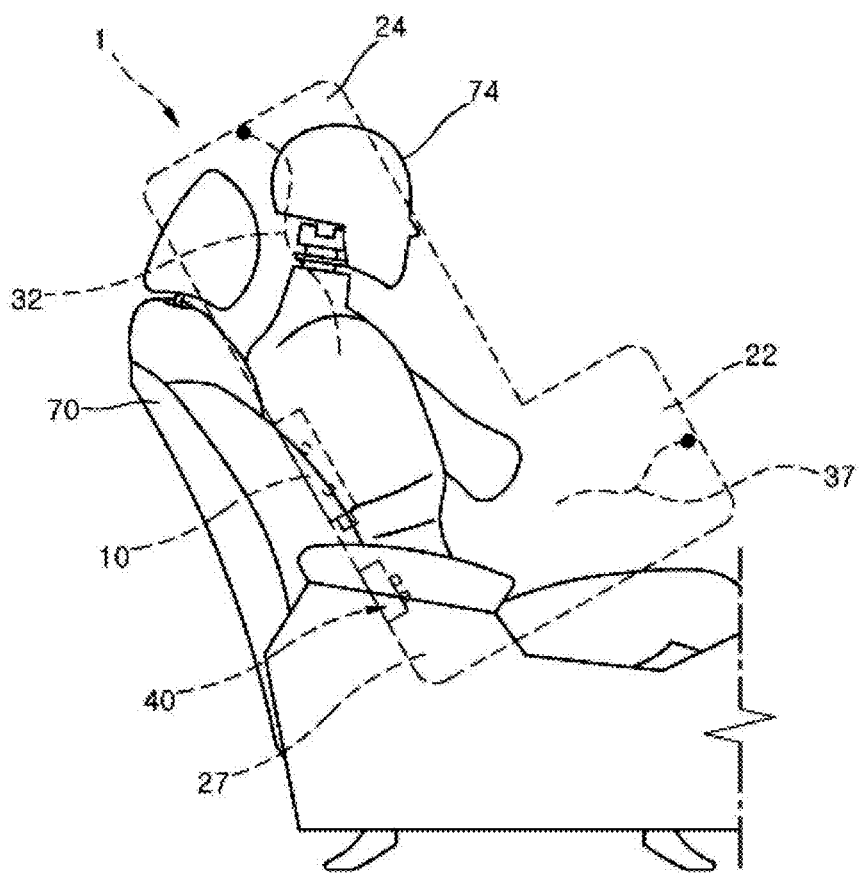
FIG. 21 is a side view schematically illustrating a state in which the center airbag device in accordance with the embodiment of the present invention is deployed in the third mode.
Figure 22:
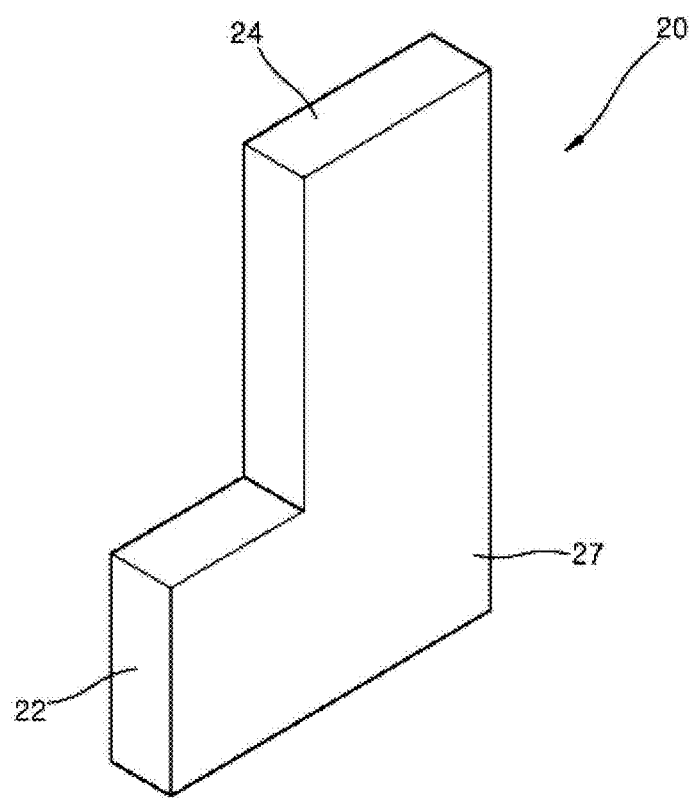
FIG. 22 is a perspective view illustrating a state in which the chamber part in accordance with the embodiment of the present invention is deployed in the third mode.
Figure 23:
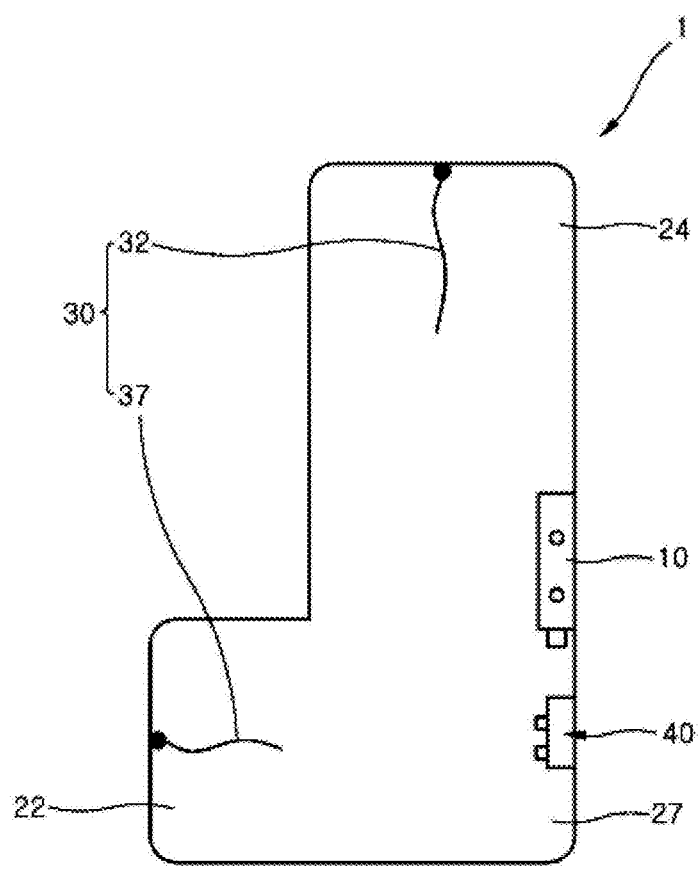
FIG. 23 is a side view illustrating a state in which the chamber part in accordance with the embodiment of the present invention is deployed in the third mode.
Figure 24:
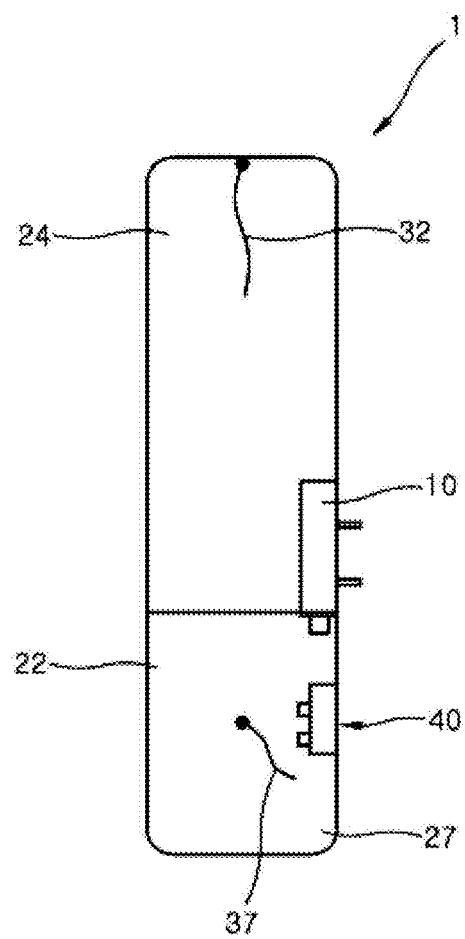
FIG. 24 is a front view illustrating a state in which the chamber part in accordance with the embodiment of the present invention is deployed in the third mode.

FIG. 20 is a front view schematically illustrating a state in which the center airbag device in accordance with the embodiment of the present invention is deployed in the third mode, FIG. 21 is a side view schematically illustrating a state in which the center airbag device in accordance with the embodiment of the present invention is deployed in the third mode, FIG. 22 is a perspective view illustrating a state in which the chamber part in accordance with the embodiment of the present invention is deployed in the third mode, FIG. 23 is a side view illustrating a state in which the chamber part in accordance with the embodiment of the present invention is deployed in the third mode, and FIG. 24 is a front view illustrating a state in which the chamber part in accordance with the embodiment of the present invention is deployed in the third mode.

As illustrated in FIGS. 20 to 24, when a far side collision occurs in the dual mode, the chamber part 20 may be deployed, and both of the first and second tethers 32 and 37 may be separated from the locking release part 40. Therefore, the coverage of the chamber part 20 may be maximized to induce a reduction in injury of the head of the driver while limiting the behavior of the driver.

Hereafter, a control method of a center airbag device in accordance with an embodiment of the present invention will be described in detail with reference to the accompanying drawings.

Figure 14:
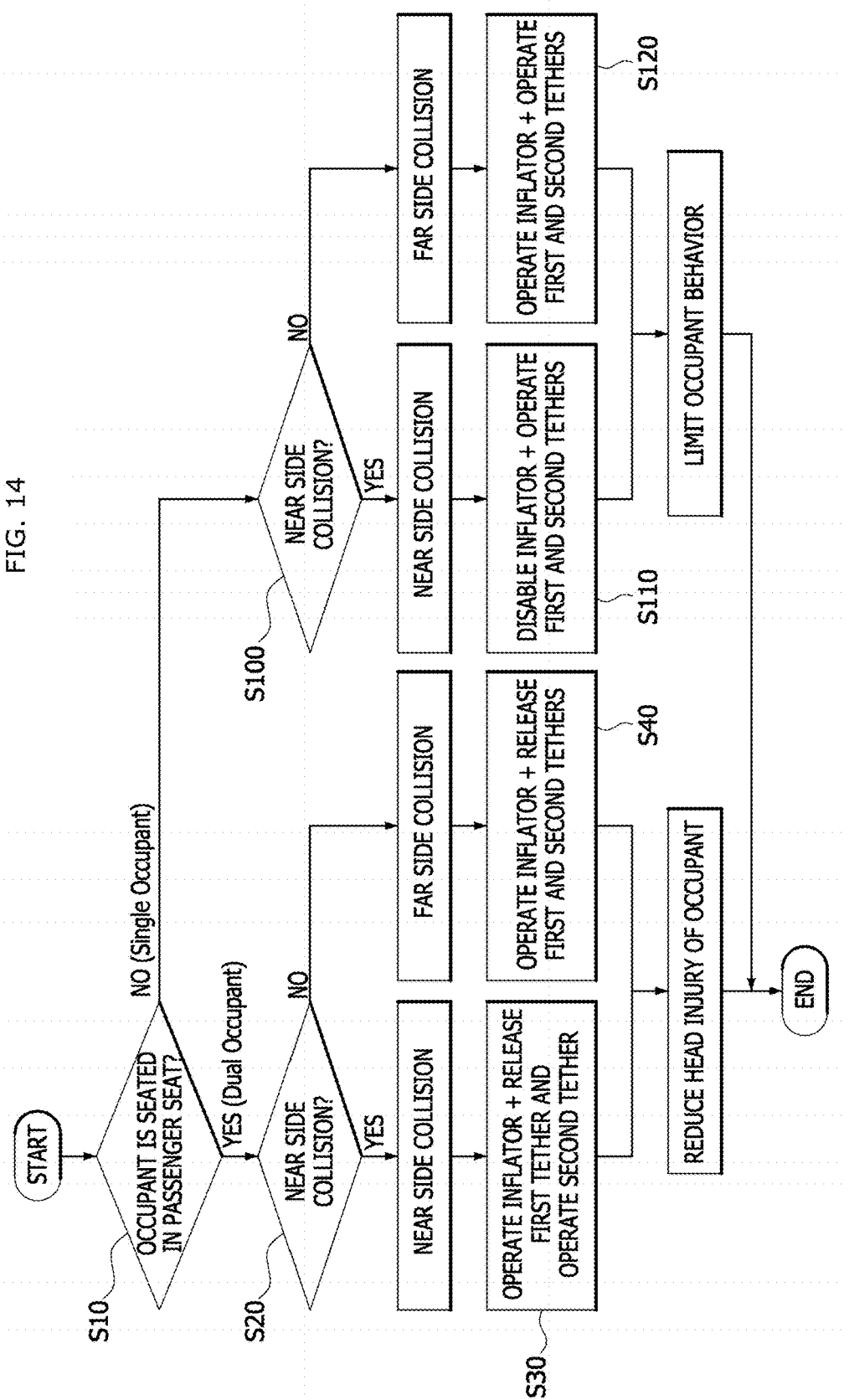
FIG. 14 is a flowchart illustrating a control method of a center airbag device in accordance with an embodiment of the present invention.

FIG. 14 is a flowchart illustrating the control method of a center airbag device in accordance with the embodiment of the present invention.

As illustrated in FIG. 14, the control method of the center airbag device 1 in accordance with the embodiment of the present invention may include determining whether an occupant is seated in the second seat 72 set to the passenger seat at step S10.

The control unit 60 receiving a sensed value of the sensor unit 50 may determine whether an occupant is seated in the second seat 72 set to the passenger seat.

When the occupant is seated in the second seat 72, the control unit 60 may determine whether a near side collision or far side collision occurred, at step S20.

The control unit 60 receiving a sensed value of the collision direction sensor 54 may determine whether a near side collision or far side collision of the car body 110 occurred.

When the near side collision occurred, the control unit 60 may increase the upper volume of the chamber part 20 positioned between the first and second seats 70 and 72 at step S30. When the far side collision occurred, the control unit 60 may increase the upper volume and side volume of the chamber part 20 at step S40.

The control unit 60 receiving the sensed value of the sensor unit 50 may operate the inflator 10 and the locking release part 40 to control the deployment of the chamber part 20.

A control method of the center airbag device 1 in accordance with another embodiment of the present invention may include determining whether an occupant is seated in the second seat 72 set to the passenger seat at step S10.

When no occupant is seated in the second seat 72, the control unit 60 may determine whether a near side collision or far side collision occurred, at step S100.

The control unit 60 receiving a sensed value of the collision direction sensor 54 may determine whether a near side collision or far side collision of the car body 110 occurred.

When the near side collision occurred, the chamber part 20 positioned between the first and second seats 70 and 72 may not be operated at step S100. When the far side collision occurred, the upper volume and side volume of the chamber part 20 may not be increased, and the inner pressure of the chamber part 20 may be increased, at step S120.

The control unit 60 receiving the sensed value of the sensor unit 50 may operate the inflator 10 and the locking release part 40 to control the deployment of the chamber part 20.

In accordance with the embodiment of the present invention, when the sensor unit 50 senses whether occupants are seated and the collision direction of the car and transmits the sensed values to the control unit 60, the control unit 60 may control the deployment of the chamber part 20, and change the deployment shape of the chamber part 20 depending on the seated states of the occupants, thereby preventing the injuries of the occupants.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A center airbag device comprising:
an inflator positioned between first and second seats, and configured to generate an operating gas;
a chamber part configured to receive the operating gas generated by the inflator, and configured to expand between the first and second seats;
an internal tether part positioned in the chamber part, and connected to one or more of top and side surfaces of the chamber part so as to control a deployment shape of the chamber part;

a locking release part connected to the internal tether part, and configured to remove a restriction of the internal tether part according to a control signal;

a sensor unit configured to sense a direction in which an impact is applied and whether a fellow occupant is seated; and a control unit configured to receive sensed values of the sensor unit and further configured to control operations of the inflator and the locking release part, wherein the chamber part comprises:
  a first chamber installed in a shape covering the inflator and the locking release part, and expanded in top and bottom directions between the first and second seats by the operation of the inflator;
  a second chamber extended from a top of the first chamber, and having an upward deployment shape guided by the internal tether part connected to an inside thereof; and
  a third chamber extended in a lateral direction of the first chamber, and having a lateral deployment shape guided by the internal tether part connected to an inside thereof.

2. The center airbag device of claim 1, wherein the internal tether part comprises:
  a first tether connecting the inside of the second chamber and the locking release part; and
  a second tether installed in a direction crossing the first tether, and connecting the inside of the third chamber and the locking release part.

3. The center airbag device of claim 2, wherein when the second chamber is deployed, a first groove part is concavely formed at a top surface of the second chamber by the first tether, and when the third chamber is deployed, a second groove part is concavely formed at a side surface of the third chamber by the second tether.

4. The center airbag device of claim 2, wherein the first tether has an insertion protrusion connected thereto, and the insertion protrusion is inserted and coupled into a connector part of the locking release part.

5. The center airbag device of claim 1, wherein the locking release part comprises;
  a locking body fixed to an inside of the chamber part;
  a connector part installed on the locking body and having an internal space into which the internal tether part is inserted; and
  a gas generator positioned in the connector part, and separating the internal tether part from the connector part by generating an expansion gas according to a control signal of the control unit.

\* \* \* \* \*